US012075209B2

(12) United States Patent
Halley et al.

(10) Patent No.: US 12,075,209 B2
(45) Date of Patent: Aug. 27, 2024

(54) ACOUSTIC WAVEGUIDE

(71) Applicant: QSC, LLC, Costa Mesa, CA (US)

(72) Inventors: Jerome Halley, Costa Mesa, CA (US); Chris Smolen, Costa Mesa, CA (US)

(73) Assignee: QSC, LLC, Costa Mesa, CA (US)

(*) Notice: Subject to any disclaimer, the term of this patent is extended or adjusted under 35 U.S.C. 154(b) by 0 days.

(21) Appl. No.: 18/344,797

(22) Filed: Jun. 29, 2023

(65) Prior Publication Data

US 2024/0007785 A1 Jan. 4, 2024

Related U.S. Application Data

(63) Continuation of application No. 17/990,087, filed on Nov. 18, 2022, now Pat. No. 11,736,859, which is a continuation of application No. 17/212,510, filed on Mar. 25, 2021, now Pat. No. 11,509,997.

(60) Provisional application No. 62/994,754, filed on Mar. 25, 2020.

(51) Int. Cl.
*H04R 1/34* (2006.01)
*H04R 1/02* (2006.01)

(52) U.S. Cl.
CPC ............. *H04R 1/345* (2013.01); *H04R 1/025* (2013.01)

(58) Field of Classification Search
CPC ................................ H04R 1/345; H04R 1/025
USPC ........................................................ 381/339
See application file for complete search history.

(56) References Cited

U.S. PATENT DOCUMENTS

| | | | |
|---|---|---|---|
| 2,089,391 | A | 8/1937 | Marion |
| 4,836,327 | A | 6/1989 | Andrews et al. |
| 4,893,343 | A | 1/1990 | Bader |
| 5,117,462 | A | 5/1992 | Bie |
| 5,163,167 | A | 11/1992 | Heil |
| 5,900,593 | A | 5/1999 | Adamson |
| 5,970,158 | A | 10/1999 | Beltran |
| 6,343,133 | B1 | 1/2002 | Adamson |
| 6,394,223 | B1 | 5/2002 | Lehman |
| 6,628,796 | B2 | 9/2003 | Adamson |
| 6,744,899 | B1 | 6/2004 | Grunberg |
| 7,278,513 | B2 | 10/2007 | Brawley |
| 8,515,102 | B1 | 8/2013 | Waller |

(Continued)

FOREIGN PATENT DOCUMENTS

| | | | |
|---|---|---|---|
| CN | 101557546 | A | 10/2009 |
| CN | 201436818 | U | 4/2010 |

(Continued)

OTHER PUBLICATIONS

International Search Report and Written Opinion, PCT Patent Application PCT/US2021/024099, mailed Jul. 9, 2021, 14 pages.

(Continued)

*Primary Examiner* — Sean H Nguyen
(74) *Attorney, Agent, or Firm* — Perkins Coie LLP

(57) ABSTRACT

An acoustic waveguide in accordance with one or more embodiments of the present technology that comprises a housing having a proximal end with an inlet aperture and a distal end with an outlet aperture, and a mounting flange positioned at the proximal end and configured to acoustically couple a driver to inlet aperture. A plurality of sound channels extend through the housing and acoustically couple the inlet aperture to the outlet aperture. Each sound channel at least partially defining a sound path has an acoustic length, wherein at least one of the sound paths of the plurality of sound channels has a bend angle that exceeds 180 degrees.

26 Claims, 12 Drawing Sheets

(56) References Cited

U.S. PATENT DOCUMENTS

| | | | |
|---|---|---|---|
| 8,607,922 | B1 | 12/2013 | Werner |
| 9,049,517 | B2 | 6/2015 | Chick |
| 9,245,513 | B1 | 1/2016 | Dimitrov |
| 9,479,861 | B2 | 10/2016 | Bisset et al. |
| 9,894,433 | B2 | 2/2018 | Bridge |
| 10,356,512 | B1 | 7/2019 | Peace |
| 10,382,860 | B2 | 8/2019 | Spillmann et al. |
| 10,531,183 | B2 | 1/2020 | Halley et al. |
| 10,848,858 | B2 | 11/2020 | Halley et al. |
| 11,240,593 | B2 | 2/2022 | Halley et al. |
| 11,509,997 | B2 | 11/2022 | Halley et al. |
| 11,582,552 | B2 | 2/2023 | Halley et al. |
| 11,736,859 | B2 | 8/2023 | Halley et al. |
| 2002/0106097 | A1 | 8/2002 | Danley et al. |
| 2005/0111673 | A1 | 5/2005 | Rosen et al. |
| 2008/0144873 | A1 | 6/2008 | Grant et al. |
| 2011/0069856 | A1 | 3/2011 | Blore et al. |
| 2014/0262600 | A1 | 9/2014 | Hughes |
| 2014/0270308 | A1 | 9/2014 | Donarski |
| 2015/0104054 | A1 | 4/2015 | Adams |
| 2016/0212523 | A1 | 7/2016 | Spillmann et al. |
| 2019/0215602 | A1 | 7/2019 | Halley et al. |
| 2021/0067866 | A1 | 3/2021 | Halley et al. |
| 2022/0217465 | A1 | 7/2022 | Halley et al. |

FOREIGN PATENT DOCUMENTS

| | | | |
|---|---|---|---|
| CN | 103392348 | A | 11/2013 |
| CN | 104837090 | A | 8/2015 |
| CN | 205491083 | U | 8/2016 |
| CN | 106454648 | A | 2/2017 |
| WO | 2002056293 | A1 | 7/2002 |

OTHER PUBLICATIONS

International Searching Authority, International Search Report and Written Opinion, PCT Patent Application PCT/US2019/012940, mailed Apr. 5, 2019, 18 pages.

ACOUSTIC WAVEGUIDE

CROSS REFERENCES TO RELATED APPLICATIONS

This application is a continuation of U.S. patent application Ser. No. 17/212,510, filed Mar. 25, 2021, which claims priority to and the benefit of U.S. Provisional Application No. 62/994,754, filed Mar. 25, 2020, both of which are incorporated herein by reference in its entirety.

TECHNICAL FIELD

The present disclosure is generally directed to multi-path acoustic waveguides.

BACKGROUND

In audio speakers, one factor that determines the sound quality is the sound pressure level (SPL), which generally depends in part on the speaker size relative to the distance between the speaker and the listener. Generally, a larger distance requires a larger speaker size. There is, however, a practical limit on the size of a large speaker. One solution is to use an array of smaller sized speakers to achieve similar acoustic results, because sound waves from the individual smaller speakers may combine to yield a combined sound wave that behaves similar to that emanating from a single large speaker. It is generally accepted that the spacing between two neighboring speakers needs to be smaller than the wavelength of the sound wave in question. The wavelength of a wave is determined as wave velocity divided by wave frequency. The wave velocity of sound in room temperature air is approximately 1130 ft/sec. For a low frequency audio sound having a frequency of 200 Hz, as an example, the corresponding wavelength is approximately 68 inches. Similarly, a midrange audio sound with a frequency of 2000 Hz, the corresponding wavelength is approximately 6.8 inches. A high frequency audio sound with an exemplary frequency of 20000 Hz has a wavelength is approximately 0.68 inches. It is difficult to achieve this small distance between speakers for high frequency sounds. This relatively small wavelength poses a problem for providing the desired spacing between high frequency speakers.

Acoustic waveguides have been developed to provide improved sound distribution from selected high-frequency drivers. Examples of such improved waveguides include the waveguides and associated technology set forth in U.S. Pat. Nos. 7,177,437, 7,953,238, 8,718,310, 8,824,717, and 9,204,212, and U.S. Patent Application Publication No. US2019-0215602, each of which is incorporated herein in its entirety by reference. While these waveguides provide substantial improvements particularly transmitting for high frequency audio sounds, there is still a need to distribute the emanation of the sound waves across the front of the speaker, producing a planar or cylindrical wavefront.

DETAILED DESCRIPTION

Figure 1:
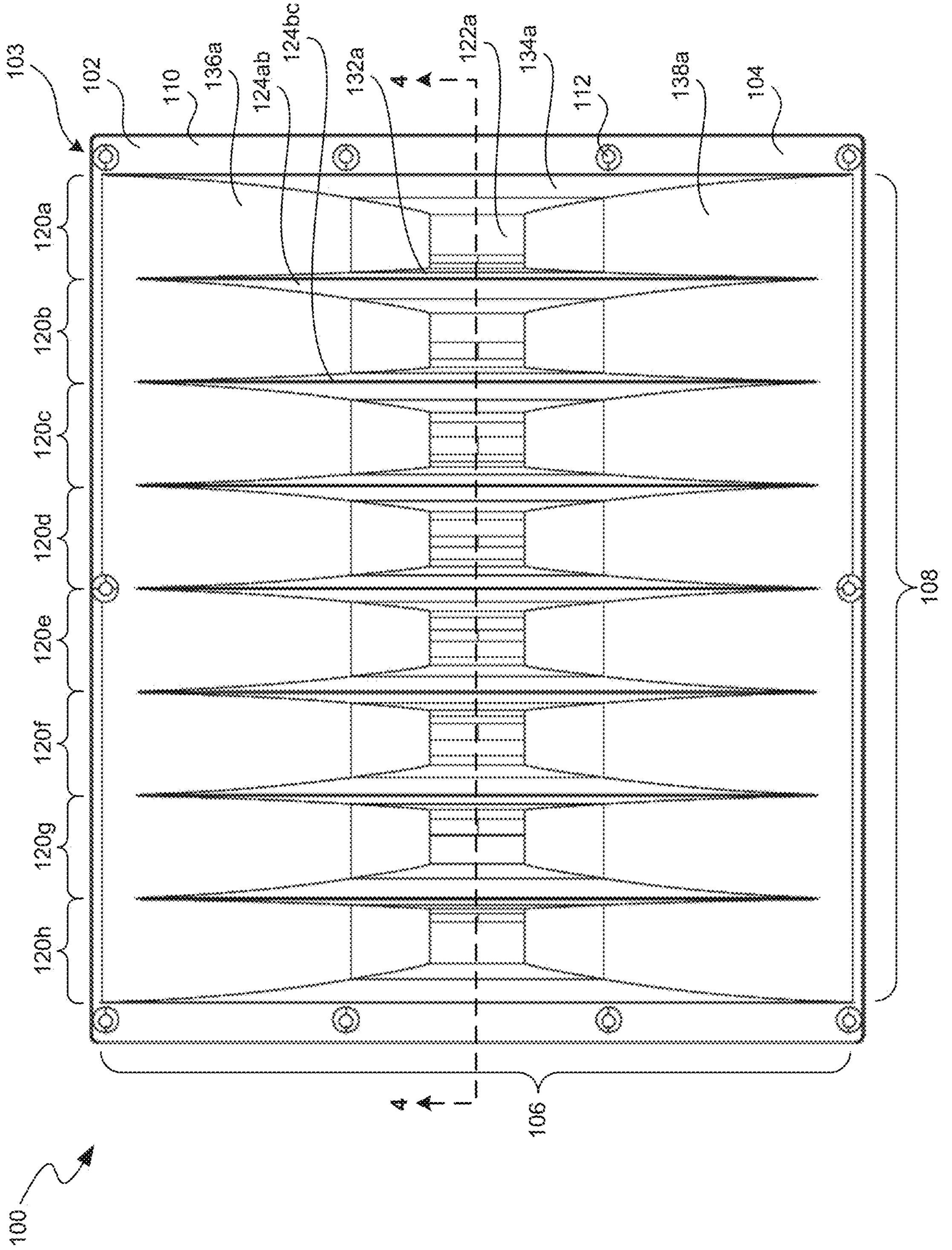
FIG. 1 is a front elevation view of an acoustic waveguide in accordance with an embodiment of the present technology.
Figure 2:
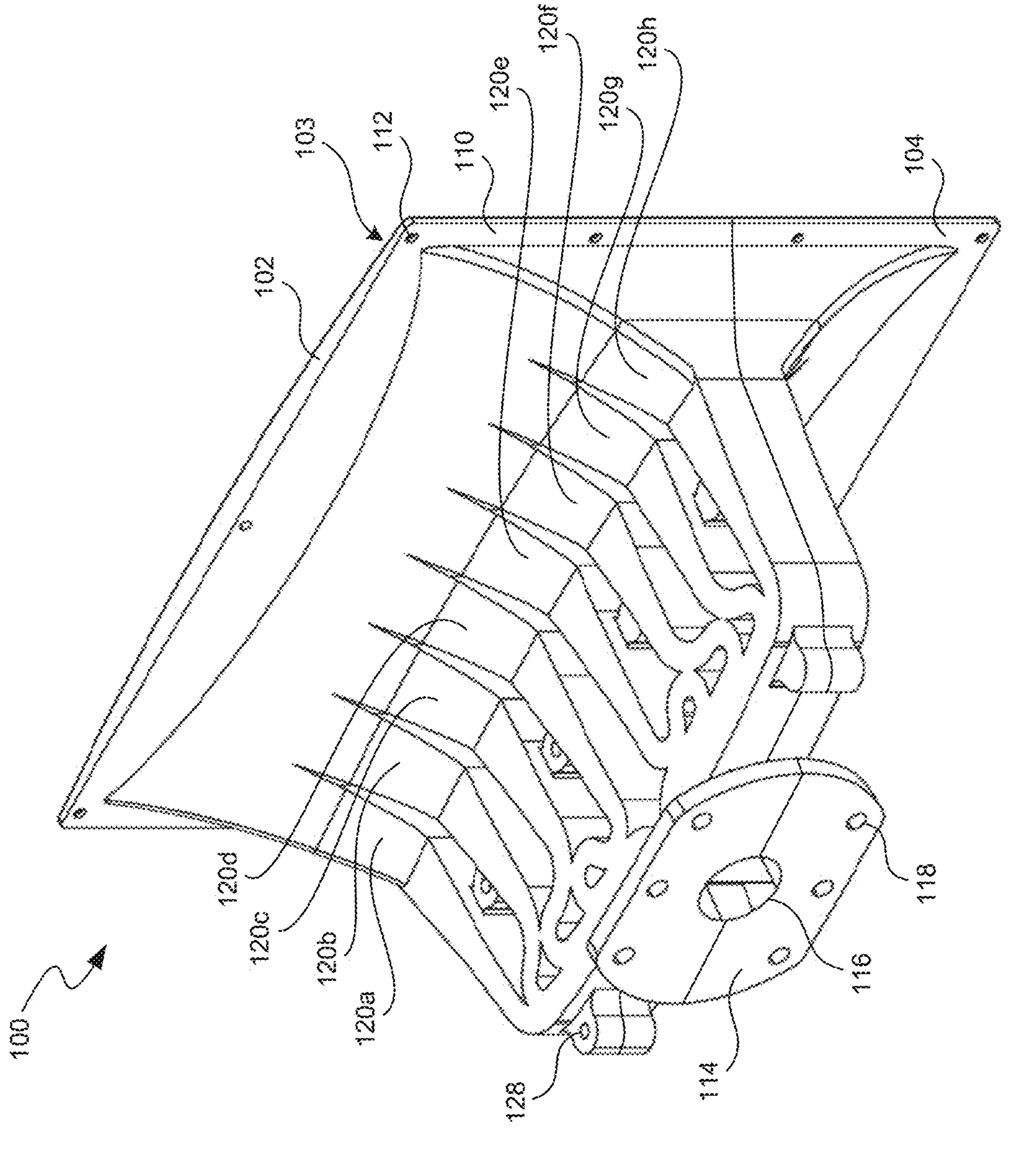
FIG. 2 is a top rear perspective view of the acoustic waveguide of FIG. 1.

The technology disclosed herein relates to acoustic waveguides and associated systems. Several embodiments of the present technology are related to acoustic waveguides configured to be coupled to one or more selected high-frequency speaker drivers and that include sound channels configured to direct the sound waves produced by the speaker drivers through the sound channels and out of a front, distal end of the acoustic waveguide. Specific details of the present technology are described herein with respect to FIGS. 1-8. Although many of the embodiments are described with respect to acoustic waveguides, it should be noted that other applications and embodiments in addition to those disclosed herein are within the scope of the present technology. Further, embodiments of the present technology can have different configurations, components, and/or procedures than those shown or described herein. Moreover, a person of ordinary skill in the art will understand that embodiments of the present technology can have configurations, components, and/or procedures in addition to those shown or described herein and that these and other embodiments can be without several of the configurations, components, and/or procedures shown or described herein without deviating from the present technology.

FIGS. 1-4 illustrate an acoustic waveguide 100 in accordance with embodiments of the present technology. The waveguide 100 of the illustrated embodiment is configured to receive a speaker driver 101 (FIG. 3), such as a high-frequency compression driver, which is coupled to a source signal generator ("SSG") that provides electrical signals to the driver 101. The driver 101 generates acoustic sound waves having selected frequencies. The waveguide 100 of the illustrated embodiment is configured for use with a high-frequency driver that generates high-frequency sound waves with a frequency in the range of approximately 500 Hz to 20 kHz. Other embodiments can be configured for use with a midrange driver or other driver that generates sound waves within a different range of frequencies. The waveguide 100 of the illustrated embodiment is configured to direct the sound received from the driver 101 through the waveguide 100 to a plurality of outlet apertures 126*a-h*, such that the sound is distributed across multiple sound paths and exits the outlet apertures 126*a-h* at the distal end 182 of the waveguide 100 in selected directions and with a coherent wavefront for a desired range of sound distribution from the waveguide 100. This configuration can allow multiple waveguides to be arrayed together to produce a substantially cylindrically shaped wavefront across the array, thereby allowing the emanating sound to project further.

The illustrated waveguide 100 includes a housing 103 having upper and lower housing portions 102 and 104 that can be coupled to a driver 101. In some embodiments, the housing portions 102 and 104 are mirror symmetrical about the mating plane of each housing portion 102 and 104 (such as the plane of the cross section of FIG. 4, where shown in FIGS. 1 and 3) and may be assembled together in a multi-piece configuration, which may include a clamshell arrangement using one or more mounting holes 128. A proximal portion 108 of the waveguide 100 has a proximal mounting flange 114 configured to securely receive the driver 101. In the illustrated embodiment, the mounting flange 114 has one or more mounting holes 118 that receive fasteners to affix the driver 101 to the mounting flange 114 with the output of the driver axially aligned with the mounting flange 114. Upon activation of the driver 101, the high-frequency sound output is directed into an inlet aperture 116 in the mounting flange 114 and through the housing 103 along a plurality of separate, isolated, arcuate sound channels 120*a-h* connected to the inlet aperture 116.

Figure 4:
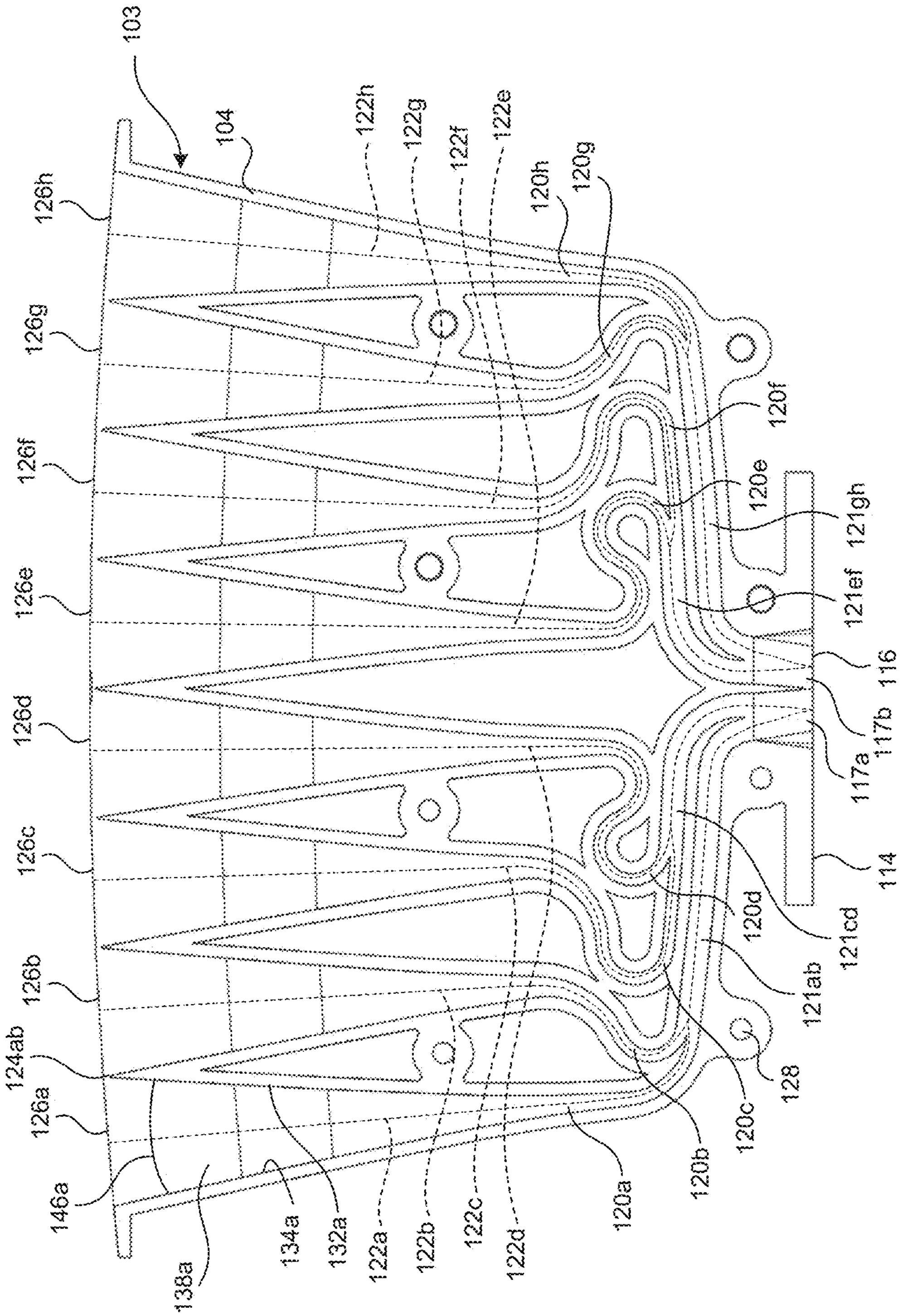
FIG. 4 is a cross-sectional plan view of the acoustic waveguide taken substantially along line 4-4 of FIG. 1.
Figure 5:
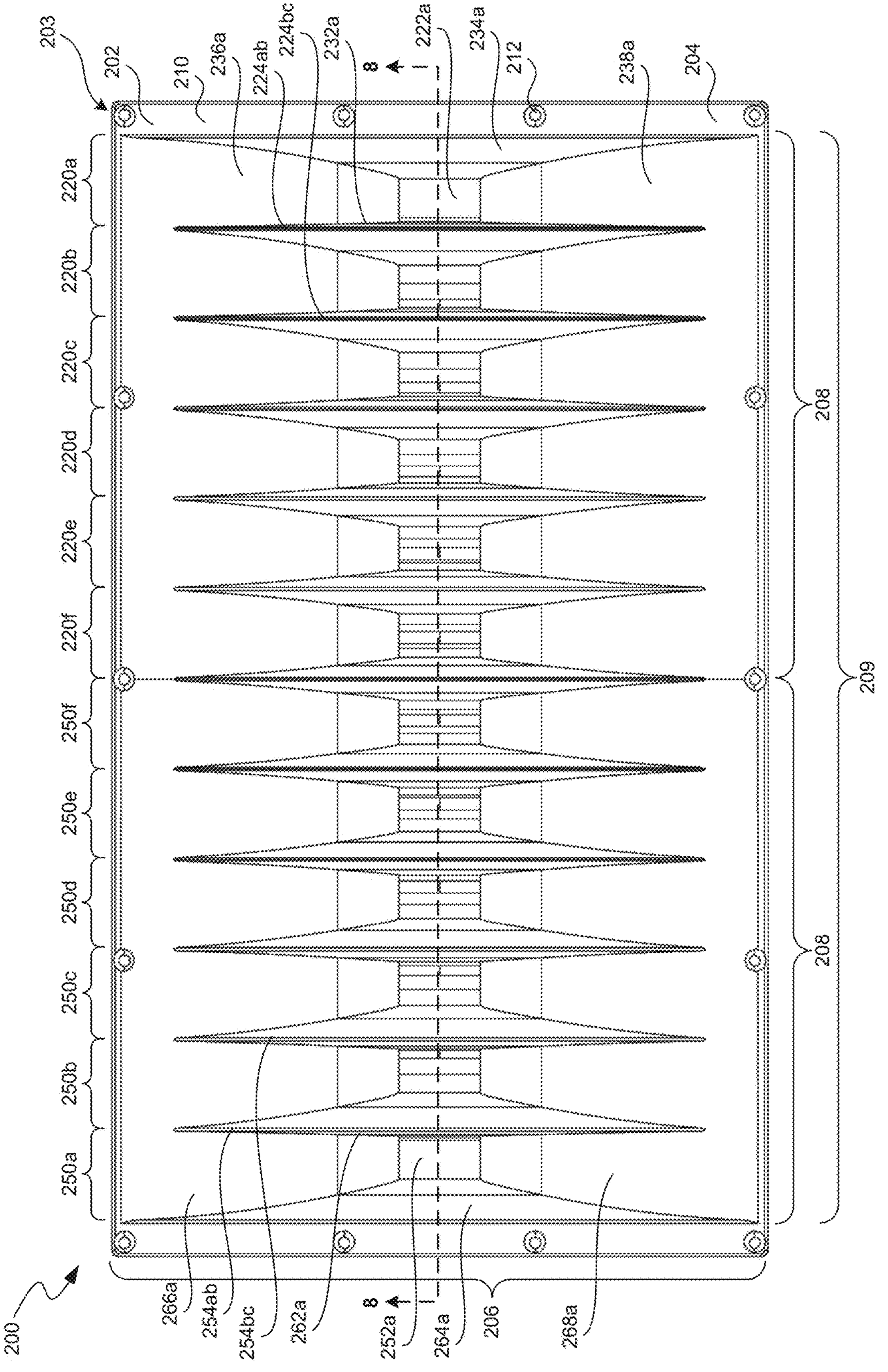
FIG. 5 is a front elevation view of an acoustic waveguide in accordance with another embodiment of the present technology.
Figure 6:
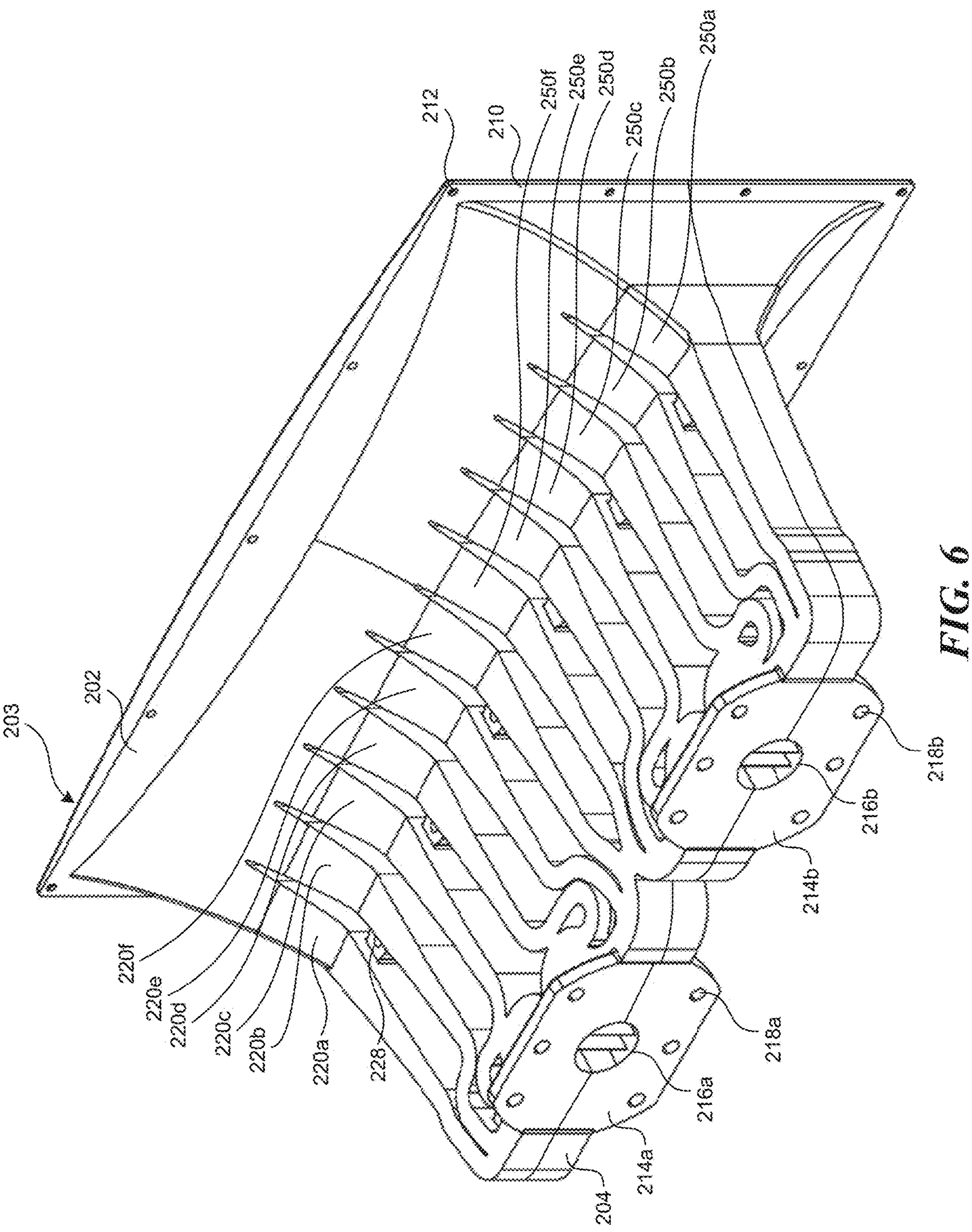
FIG. 6 is a top rear perspective view of the acoustic waveguide of FIG. 5.
Figure 7:
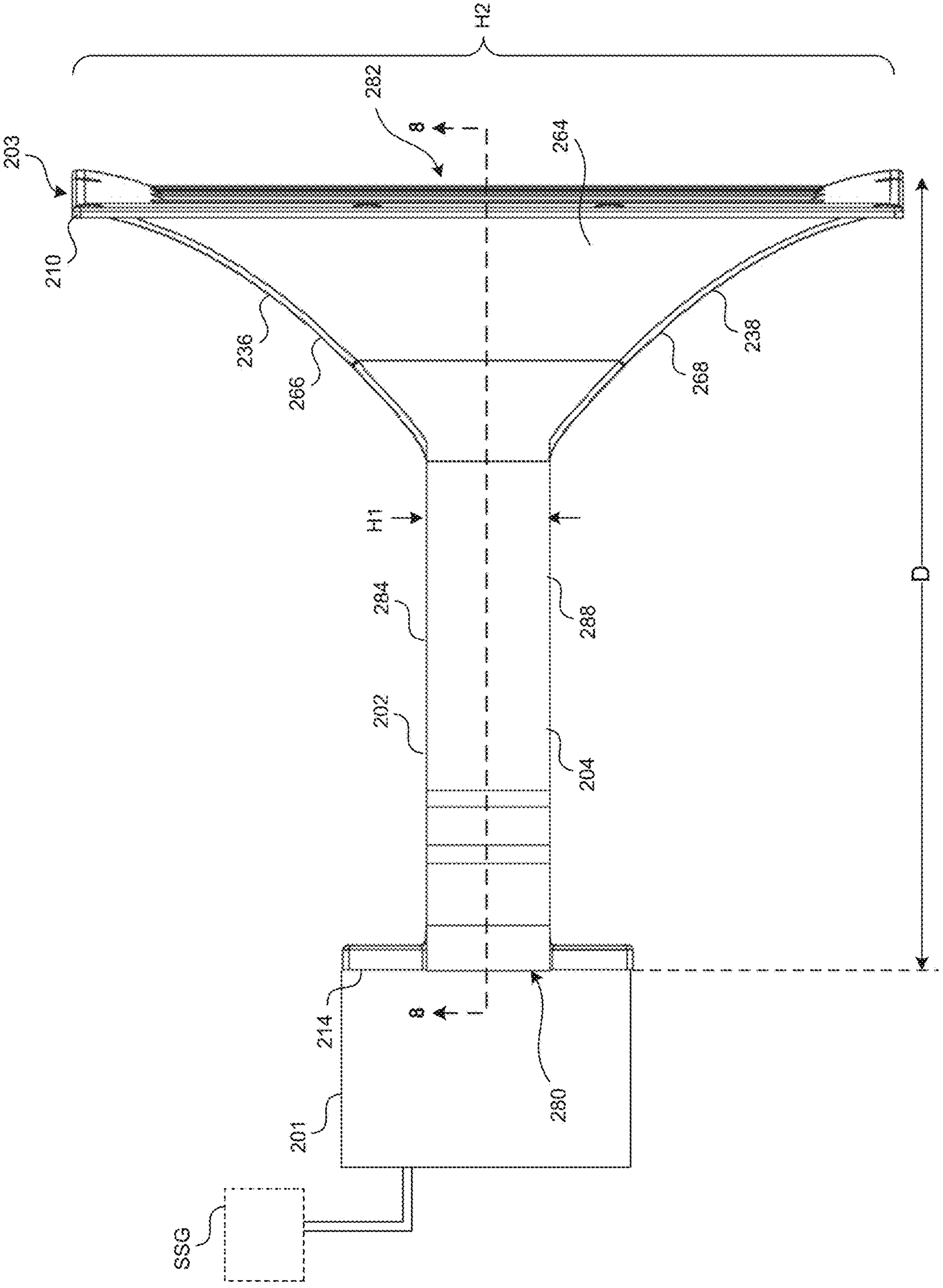
FIG. 7 is a left side elevation view of the acoustic waveguide of FIG. 5.

As best seen in FIG. 4, the sound channels 120*a-h* extend through the waveguide 100 and terminate at a plurality of adjacent outlet apertures 126*a-h* positioned at the distal end 182 of the housing 103. In the illustrated embodiment, a distal mounting flange 110 is provided at the distal end 182 of the housing 103 generally adjacent to the outlet apertures 126*a-h*. The distal mounting flange 110 may be configured to be affixed to a speaker assembly (not shown) to hold the waveguide 100 and the associated driver 101 in a selected position on or in the speaker assembly. In some embodiments, the distal mounting flange 110 can be used to secure the waveguide 100 to a horn at a selected alignment in the speaker assembly. In some configurations the waveguide 100 may be an integral portion of a speaker assembly, such that the housing 103 does not include a distal mounting flange. For example, the distal portion of the waveguide will be built directly into the baffle of a speaker assembly.

Figure 3:
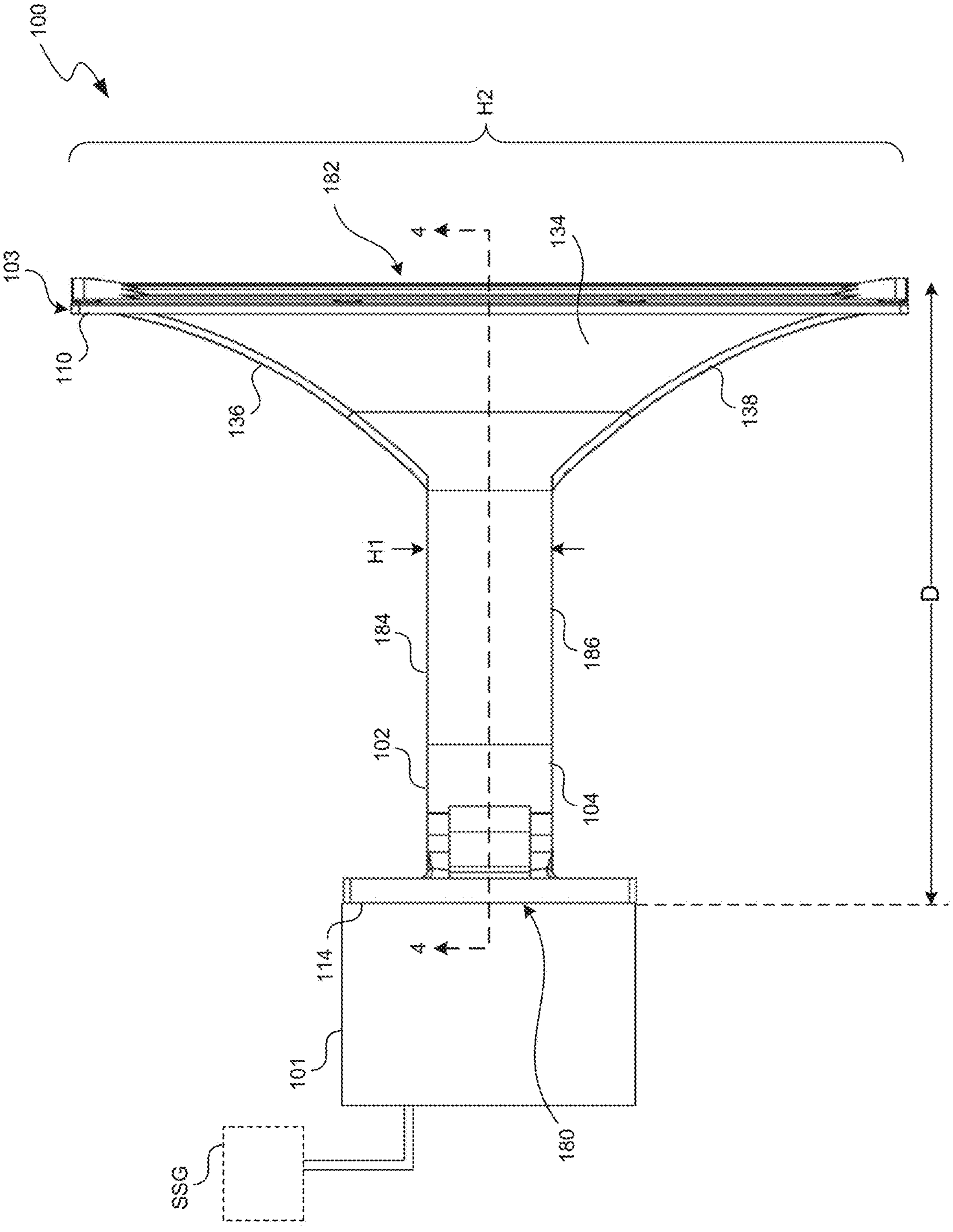
FIG. 3 is a left side elevation view of the acoustic waveguide of FIG. 1.

As shown in FIG. 3, the driver 101 is affixed to the proximal mounting flange 114 and is oriented relative to the housing 103 such that a front face of the driver 101 (i.e., the portion of the driver 101 from which the high-frequency sound is emitted) is axially aligned with the inlet aperture 116. The front face of the driver 101 of the illustrated embodiment is substantially parallel with the proximal mounting flange 114 and generally normal to the top and/or bottom surface 184 and 186 of the housing 103 near the mounting flange. In other embodiments, the front face of the driver 101 and/or the mounting flange 114 can be oriented at another selected angle relative to the housing 103 or to the inlet aperture 116. In such mounting configurations, the driver 101 may be in a skewed orientation relative to the housing generally adjacent to the inlet aperture 116. In some embodiments, the front face of the driver can be at an angle in the range of approximately 0°-90° relative to the distal face of the housing and the outlet apertures 126*a-h*.

As seen in FIG. 4, the inlet aperture 116 in the proximal mounting flange 114 is acoustically coupled to a plurality of spaced-apart sound channels 120*a-h* extending through the housing 103. The sound channels 120 *a-h* are configured to divide sound from the driver 101 and simultaneously directed their respective portions of the sound out of the waveguide 100 through the adjacent distal outlet apertures 126*a-h* in the coherent wavefront.

In the illustrated embodiment, the housing portions 102 and 104 are configured to define eight sound channels 120*a-h* defining a path through the housing 103. In other embodiments, the housing 103 can have more or less than eight sound channels 120*a-h*, depending upon the desired configuration of the waveguide 100. In some embodiments, the sound channels 120*a-h* are configured so the ratio of the depth D of the waveguide 100 to the total width 108 of the outlet apertures 126*a-h* is in the range of about 1:1.2 to 1:2. In some embodiments the ratio is in the range of about 1:1.4 to 1:1.8. In the embodiment illustrated in FIGS. 1-4, the ratio of the depth D to the total width 108 is about 1:1.44. In the embodiment illustrated in FIGS. 5-8, discussed in greater detail below, the ratio of the waveguide's depth D to the total width of the outlet apertures is about 1:1.73.

Referring again to FIG. 4, the sound channels 120*a-h* partially define a plurality of sound paths 122*a-h* and are each coupled to the driver 101 and a respective one of the spaced-apart outlet apertures 126*a-h* at the distal end 182 of the housing 103. The high-frequency sound waves travel from the driver 101 through the housing 103 along the sound paths 122*a-h* via the plurality of sound channels 120*a-h* and exit the housing 103 in selected directions though the outlet apertures 126*a-h*. In some embodiments, the sound paths 122*a-h* have a geometry configured to crossover between frequencies in the range of about 500 Hz to 2 kHz.

As shown in FIG. 4, the sound channels 120*a-h* of the illustrated embodiment are curved and configured so the sound paths 122*a-h* have substantially equal lengths (e.g., equal acoustic lengths), such that all of the high-frequency sound waves simultaneously entering the inlet aperture 116 from the driver 101 will exit the respective outlet apertures 126*a-h* substantially simultaneously to produce the coherent wave front. At least some of the sound channels 120*a-h* in the waveguide 100 of the illustrated embodiment define a curved path with bends that exceed 180 degrees, which allows for elongated sound paths within the housing 103 while maintaining a minimum depth D of the housing, and while still maintaining the integrity of the sound waves moving through the arcuate sound paths. The sound channels 120*a-h* can be sized and shaped such that the sum of the cross-sectional area for each of the sound channels 120*a-h* at points near the inlet aperture 116 is substantially equal to the surface area of the output surface of the driver 101.

After the sound waves from the driver enter the inlet aperture 116, the sound waves divide between inlet sound channels 117*a* and 117*b*, divide again between secondary sound channels 121*ab*, 121*cd*, 121*ef*, and 121*gh*, and finally divide into the sound channels 120*a-h*. The sound waves entering the waveguide 100 travel the same distance as each of the other sound waves in the other sound channels 120*a-h* and reach the outlet apertures 126*a-h* at the distal end 182 at substantially the same time. Based on the configuration of the inlet sound channels 117*a* and 117*b*, the secondary sound channels 121*ab*, 121*cd*, 121*ef*, and 121*gh*, and the sound channels 120*a-h*, each of the high-frequency sound signals entering the waveguide 100 at the same time will also exit the outlet apertures 126*a-h* at the same time, even though they each pass through different inlet sound channels 117*a* and 117*b*, secondary sound channels 121*ab*, 121*cd*, 121*ef*, and 121*gh*, and travel in different directions. In other embodiments, the individual sound channels 120*a-h* can be sized such that some or all of the corresponding sound paths 122*a-h* have different lengths. In some embodiments, the sound paths 122*a-h* have an acoustic length of between about 120% and 200% of the depth D (see FIG. 3) of the waveguide 100. In other embodiments, the sound paths 122*a-h* have an acoustic length of between about 130% and 145% of the depth D of the waveguide 100. In yet other embodiments, the sound paths 122_a-h_ have an acoustic length of between about 138% and 141% of the depth D of the waveguide 100. In further embodiments, the sound paths 122_a-h_ have an acoustic length of about 139.6% of the depth D of the waveguide 100.

The secondary sound channels 121_ab_, 121_cd_, 121_ef_, and 121_gh_ impart an initial arcuate bend to the sound paths 122_a-h_ after the sound waves exit the inlet sound channels 117_a_ and 117_b_. The initial arcuate bend directs the sound paths 112_a-h_ laterally from a direction substantially perpendicular to the mounting flange 114. In this regard, the secondary sound channels 121_ab_, 121_cd_, 121_ef_, and 121_gh_ change the direction of the sound waves by about 70° to about 90° from the direction at the inlet aperture 116. After the sound waves exit the secondary sound channels 121_ab_, 121_cd_, 121_ef_, and 121_gh_, the sound waves are divided into the sound channels 120_a-h_, which are each configured with various arcuate bends starting downstream of the secondary sound channels 121_ab_, 121_cd_, 121_ef_, and 121_gh_ near the proximal end 180 of the housing portions 102 and 104. The bends in the sound channels 120_a-h_ may be substantially smooth (i.e., not abrupt) as to not adversely interact with the sound waves traveling through the sound channels 120_a-h_. In some embodiments the radius of curvature of the bends in the sound channels 120_a-h_ is equal to or greater than double the width of the sound channel.

In some embodiments, each of the sound channels 120_a-h_ has a different arcuate bend based on the position of an outlet of the secondary sound channels 121_ab_, 121_cd_, 121_ef_, and 121_gh_ and the outlet apertures 126_a-h_ of each of the sound paths 122_a-h_. The waveguide 100 is generally mirror symmetrical about a plane parallel to the view in FIG. 3 centered at the central axis of the inlet aperture 116. Accordingly, each opposing pair of sound channels 120_a-h_ will have mirror symmetrical geometry about the mirror symmetrical plane (e.g., 120_a_ and 120_h_, 120_b_, and 120_g_, etc.). For example, in one embodiment, the sound channels 120_a_ and 120_h_ are bent opposite each other by an angle between about 70° and 90°, which creates an arcuate portion of the sound paths 122_a_ and 122_h_. The sound channels 120_b_ and 120_g_ are bent opposite to each other by an angle between about 110° and 140°, which creates an arcuate portion of the sound paths 122_b_ and 122_g_; the sound channels 120_c_ and 120_f_ are bent opposite to each other by an angle between about 170° and 200°, which creates an arcuate portion of the sound paths 122_c_ and 122_f_; and the sound channels 120_d_ and 120_e_ are bent opposite to each other by an angle between about 240° and 280°, which creates an arcuate portion of the sound paths 122_d_ and 122_e_. Each bend in the illustrated embodiment has a bend radius in the range of about 0.25 inches to 0.8 inches. In each of the sound paths 122_b-g_, another bend following the initial bend in the sound channels 120_b-g_ again changes the direction of the sound paths 122_b-g_ to align the paths substantially parallel to the direction the sound waves travel when entering the inlet aperture 116 to align with the direction in which the sound is output from the waveguide 100. However, in other embodiments, any number of bends can be added to the sound channels 120_a-h_ to change the direction of the sound paths 122_a-h_ while maintaining the desired acoustic lengths of the sound paths.

In the illustrated embodiment shown in FIGS. 1-4, the sound channels 120_a-h_ have a flared configuration along all or portions of the sound channels 120_a-h_. For example, in some embodiments, the sound channels 120_a-h_ continuously flare laterally and/or vertically outwards along the entire length of the sound channels 120_a-h_ within or downstream of the bend areas discussed above. In other embodiments, the sound channels 120_a-h_ only flare out at portions near the distal end 182 of the housing portions 102 and 104. In general, the sound channels 120_a-h_ can have any suitable flaring configuration, and one or both of the flares may continue until the sound waves reach the outlet apertures 126_a-h_. In some embodiments, the flares along the distal portions of the sound channels 120_a-h_ are maintained relatively as straight as possible, while the channel lengths are equalized by the bends in the sound channels 120_a-h_ closer to the proximal end portions of the sound channels. Accordingly, the bends in the sound channels 120_a-h_ are configured to maximize the length of the portion of the sound channels 120_a-h_ having the lateral and vertical flares. These longer flared portions allow for the sidewalls of each flare to have lower flare angles (i.e., closer to parallel side walls). This will allow the sound waves to exit the outlet apertures 126_a-h_ in a more planar, uniform wave configuration. This arrangement improves the summation of the waves at the exit of the waveguide 100. The properly shaped flared portions also aid in extending the low-frequency cutoff of the acoustic device.

The flaring of the one or more of the sound channels 120_a-h_ can be achieved by a change in width of the sound channel along some or all of the sound channel, or by a change in height of the sound channel along some or all of the sound channel, or by a change in both the width and height of the sound channel along some or all of the sound channel. The lateral flare of the sound channels 120_a-h_ includes lateral flare surfaces 132_a-h_ and 134_a-h_, respectively, and creates a single, laterally united wavefront, as will be explained in greater detail below. The lateral flare surfaces of adjacent sound channels terminate at a peak, e.g., the lateral flare surface 132_a_ and the lateral flare surface 134_b_ terminate at a peak 124_ab_, the lateral flare surfaces 132_b_ and 134_c_ terminate at a peak 124_bc_, etc.

To ensure the sound waves spread laterally and combine sufficiently to form a united wavefront, the sound channels 120_a-h_ (and 220_a-f_, and 250_a-f_ for an acoustic waveguide 200, described below) may begin to flare in the lateral direction before reaching the distal end 182 (e.g., as shown in FIG. 4). With such a configuration, the high-frequency sound waves can start to spread out before reaching the distal end 182 to merge into a single wavefront in a shorter distance after exiting the outlet apertures 126_a-h_ (and 226_a-f_, and 256_a-f_ for the acoustic waveguide 200). In some embodiments, extensions (not shown) may be positioned distal to the outlet apertures to further direct the sound waves exiting the sound paths.

The lateral flare surfaces 132_a-h_ and 134_a-h_ gradually flare and define a flare angle 146_a-h_ at the distal portions of the sound channels 120_a-h_ that can be between about and 25°, and more preferably in the range of about 10° and 20°. In other embodiments, the lateral flare surfaces 132_a-h_ and 134_a-h_ have a flare angle 146_a-h_ at the distal portions of the sound channels 120_a-h_ between about 12° and 18°. In further embodiments, the lateral flare surfaces 132_a-h_ and 134_a-h_ may have a flare angle 146_a-h_ at the distal portions of the sound channels 120_a-h_ between about 14° and 16°. The width of each outlet aperture 126_a-h_ in the lateral direction can comprise between about 7% and 14% of the overall width 108 of the waveguide 100. In the illustrated embodiment, the width of each outlet aperture 126_a-h_ in the lateral direction can comprise is about 8.33% of the overall width 108 of the waveguide 100. In other embodiments having between 12 and 8 sound channels, the width of each outlet aperture 126_a-h_ in the lateral direction comprises between about 8% and 13% of the overall width 108 of the waveguide 100. Other embodiments having greater or fewer sound channels changes can have outlet apertures 126*a-h* with other widths in the lateral direction comprises relative to the overall width 108 of the waveguide 100.

It is noted that the sound channels 120 A-H have pipe resonance, were in the frequency of the pipe resonance depends on the length of the sound channel 120 A-H. The depth of the lateral flare surface is 132 A-H and 134A-H is determined by the overall depth D of the waveguide 100, and the depth of the flares generally controls how low in frequency the waveguide 100 can play. Accordingly, the dimensions of the sound channels 120 A-H, including the lengths of the portions of the sound channels, and the depth of the flares, are selected so that at least one of the pipe resonance frequency of the sound channel 120 A-H coincides with the low end of the waveguide designed frequency spectrum. As a result, the waveguide 100 is provided with a sensitivity boost at about the crossover frequency, which coupled with the sensitivity boost from the flared section, provides enhanced performance of the waveguide at and around the crossover frequency.

In embodiments with lateral flares, generally having lateral flare surfaces 132*a-h* and 134*a-h*, the depth of the flared portions of the sound channels 120*a-h* is between about 80% and 87% of the depth D of the waveguide 100, and/or the lateral flared portions of the sound channels 120*a-h* comprise between about 57% and 73% of the overall length of the sound paths 122*a-h*. In other embodiments, the depth of the flared portion of the sound channels 120*a-h* is between about 83% and 87% of the depth D of the waveguide 100, and/or lateral flared portions of the sound channels 120*a-h* comprise between about 60% and 64% of the overall length of the sound paths 122*a-h*. In at least one embodiment, the depth of the flared portion of the sound channels 120*a-h* is between about 84% and 86% of the depth D of the waveguide 100, and/or lateral flared portions of the sound channels 120*a-h* comprise between about 61% and 63% of the overall length of the sound paths 122*a-h*. In further embodiments, the depth of the flared portion of the sound channels 120*a-h* is greater than about 82% of the depth D of the waveguide 100, and/or the lateral flared portions of the sound channels 120*a-h* comprise about 65% of the overall length of the sound paths 122*a-h*. The lateral flare surfaces 132*a-h* and 134*a-h* may be defined by a conic shape having a fixed length, rho value, exit angle, entrance width, and exit width. In another embodiment with the sound channels 120*a-h* having different resonance frequencies than the above-referenced embodiment, the length of the sound channels 120*a-h* can be longer or have different lengths while having the lateral flare surface is 132*a-h* and 134*a-h* forming a percentage of the depth D of the waveguide 100. For example, the depth of the flared portion of the sound channels 100*a-h* can be in the range of approximately 55%-65%, or more specifically in the range of approximately 58%-62%, or more specifically, in the range of approximately 59%-61%, and even more specifically in the range of 59.62%-60.98%. In yet another embodiment wherein the sound channels 120*a-h* have different resonance frequencies than the above embodiments, the depth of the flared portion of the sound channels 120*a-h* can be in the range of approximately 49%-69%, or more specifically in the range of approximately 52%-66%, or more specifically, in the range of approximately 54%-64%, and even more specifically in the range of 54.67%-63.63%.

The vertical flare of the sound channels 120*a-h* includes vertical flare surfaces 136*a-h* and 138*a-h*, respectively, and creates radiation of the sound waves, to spread the sound waves vertically, such as the sound wave radiation from a horn, and to produce a substantially constant angle of radiation across a wide range of frequencies. In embodiments with vertical flares, generally having vertical flare surfaces 136*a-h* and 138*a-h*, the vertical flared portions of the sound channels 120*a-h* comprise between about 20% and 30% of the overall length of the sound paths 122*a-h*. In other embodiments, the vertical flared portions of the sound channels 120*a-h* comprise between about 23% and 27% of the overall length of the sound paths 122*a-h*. In further embodiments, the vertical flared portions of the sound channels 120*a-h* comprise about 25% of the overall length of the sound paths 122*a-h*. The vertical flare surfaces 136*a-h* and 138*a-h* may be defined by a dual conic shape having a first portion with a fixed length, rho value, exit angle, and exit width, and a second portion with a fixed length, rho value, exit angle, and exit width. The vertical flare surfaces 136*a-h* and 138*a-h* may be defined by other configurations, such as a conic-arc-conic configuration, or an arc-arc-conic configuration.

Figure 8:
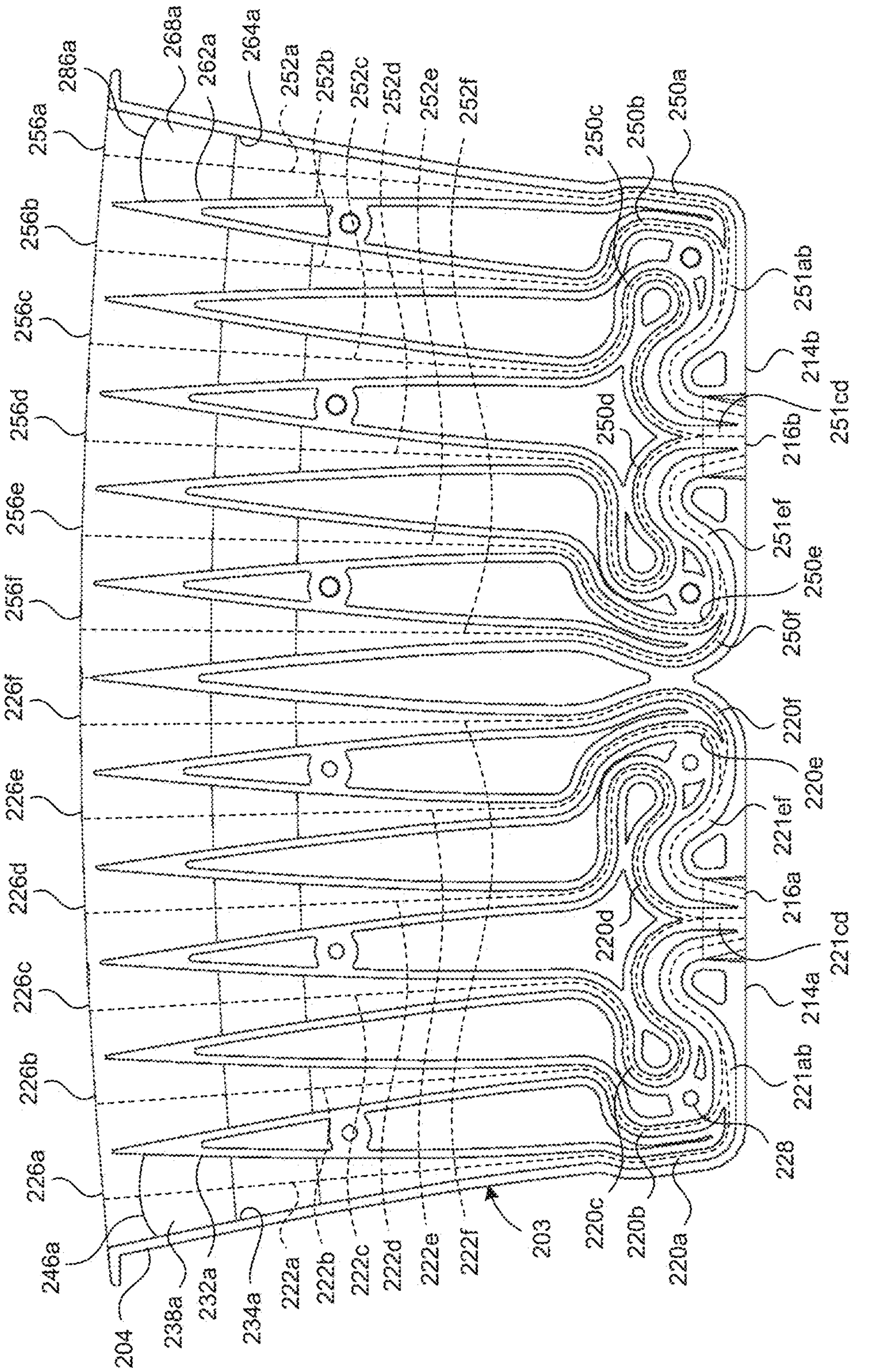
FIG. 8 is a cross-sectional plan view of the acoustic waveguide taken substantially along line 8-8 of FIG. 5.
Figure 9A:
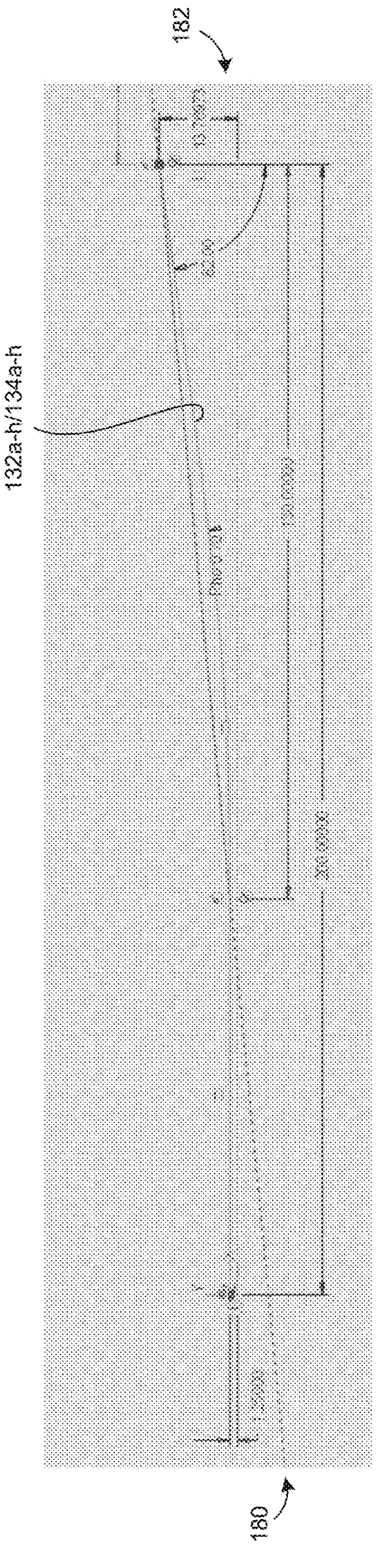
FIGS. 9A and 9B are schematic detail views of a lateral flare profile and a vertical flare profile, respectively, of the acoustic waveguide of FIG. 1.
Figure 9B:
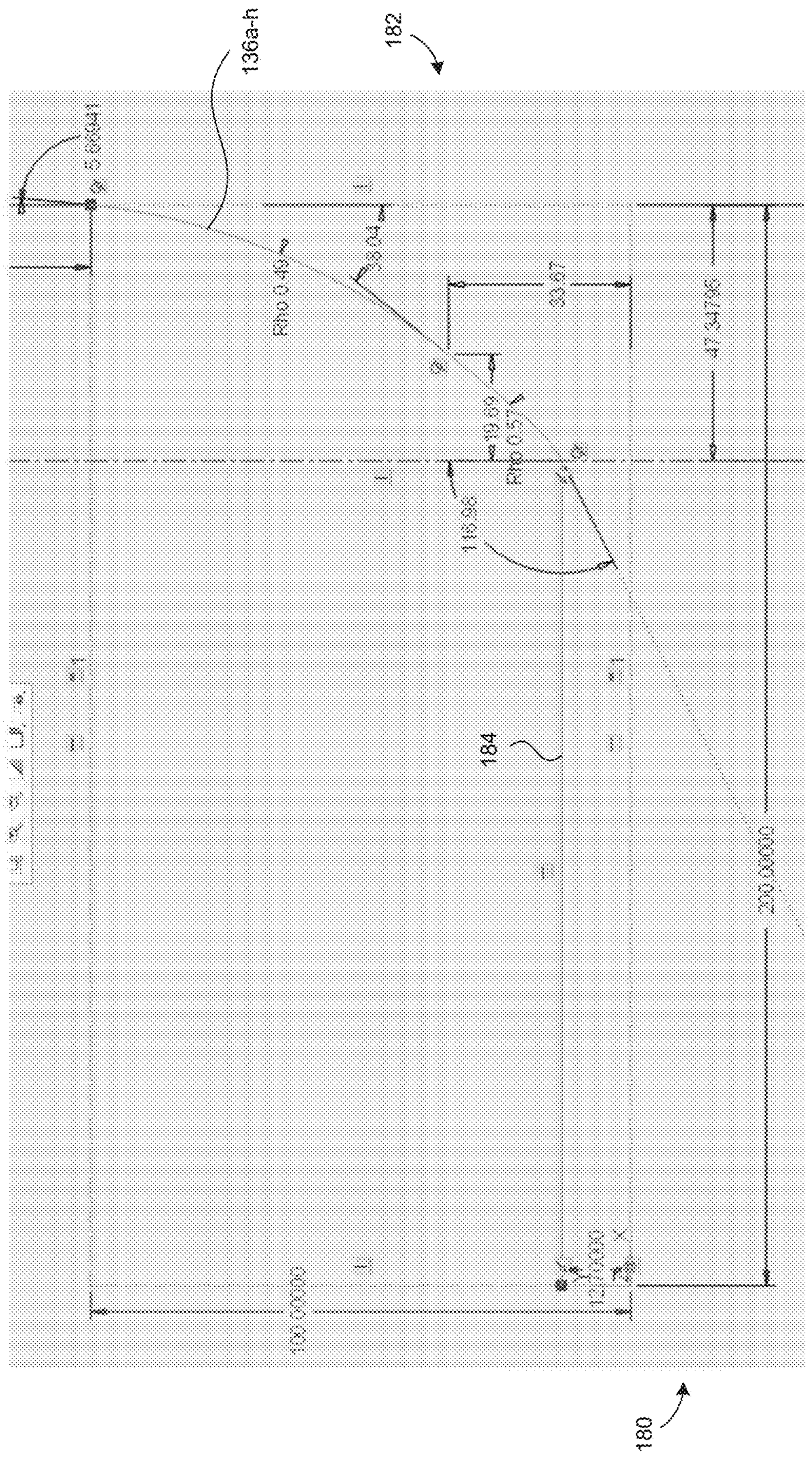

In some embodiments, the vertical flare surfaces 136*a-h* and 138*a-h* are configured to provide an acoustic dispersion pattern having an angle in the range of about 30°-130°. In the embodiment illustrated in FIGS. 1-4, the acoustic dispersion pattern has an angle of approximately 105° from the distal end 182 along the vertical direction, and in the embodiment illustrated in FIGS. 5-8, the acoustic dispersion pattern has an angle of about 90°. In the coupling direction, the flares are brought to the outer surface of the waveguide 100 so the flares can be as long as possible, even though the perpendicular horn flare begins to shape the wave in that direction before the flare is complete. This improves low-frequency loading and creates a more coherent line source in the coupling direction. FIGS. 9A and 9B show exemplary profiles in the lateral (FIG. 9A) and vertical (FIG. 9B) directions in a schematic representation. The profiles are shown with straightened sound paths for sake of clarity and illustration purposes only. These examples show dimensional detail of one representative configuration of the lateral and vertical flares in the sound channels 120*a-h*, which may define arcuate sound channels.

The flared shape described herein can be expected to maximize the efficiency with which sound waves traveling through the sound channels 120*a-h* are transferred into the air outside of the housing portions 102 and 104. The flaring may also help damp pipe resonances that may exist within the sound channels 120*a-h*, such as by adding an exponential curve to the flared surfaces. In other embodiments, however, the sound channels 120*a-h* may not have a flared configuration, or the amount of flaring occurring in some or all of the sound channels may be different. In other embodiments, the sound channels 120*a-h* can be further divided, such as by providing shaped inserts or dividing structures (not shown) that split the sound channels 120*a-h* into two or more subchannels, each of which has the same overall sound path length as the other sound channels 120*a-h*.

Adjustments to the dimensions of the sound channel can also be achieved by controlling the channel height along some or all of the length of the channel. For example, FIG. 3 shows a side elevation view of a housing portions 102 and 104 of the waveguide 100. The housing portions 102 and 104 includes a rear mounting flange 114. During operation of the waveguide 100, a high-frequency driver coupled to the rear mounting flange 114 can generate high-frequency sound waves that enter the housing portions 102 and 104 by passing through the inlet aperture 116. Upon entering the housing portions 102 and 104, the high-frequency sound waves are directed into the sound channels 120*a-h* through inlet sound channel 117*a* and 117*b*, and through secondary sound channels 121*ab*, 121*cd*, 121*ef*, and 121*gh*. The sound channels 120*a-h* are configured to direct the sound waves toward the distal end 182 of the housing portions 102 and 104.

In this illustrated embodiment, each sound channel 120*a-h* can flare vertically as it approaches the distal end 182 of the housing portions 102 and 104, such that the channel has a first height H1 (FIG. 3) at a point near the inlet aperture 116 and a second height H2 that is greater than the first height H1. In some embodiments, all of the sound channels 120*a-h* increase in height as they extend toward the distal end 182. In the illustrated embodiment, the distal end 182 of the waveguide 100 at the outlet apertures 126*a-h* is configured with an arcuate distal end 182 (FIG. 4) when viewed from a plan orientation. In some embodiments, the arcuate distal end 182 has a radius of about 70 inches and a localized angle along the arc of between about 5.5° and 6.5°; however, other radii and angles are within the scope of the present technology. Taking the localized angle of the arc between about 11° and 13°, the resulting acoustic radiation beam is about 15° from the distal end 182. In this regard, stacking two adjacent acoustic waveguides 100 results in about 30° of coverage, three adjacent acoustic waveguides result in about 45°, etc. Other embodiments can have other flare configurations. For example, a single waveguide can be configured with virtually no vertical flare or up to about 30° or 40° or more.

The distal end 182 may be generally perpendicular to the longitudinal axis of the waveguide 100 when viewed from the side, such as in the orientation shown in FIG. 3. The shape of the arcuate distal end 182 can produce a sound wave profile for wider distribution. In other embodiments, the waveguide 100 can be configured with a curved or substantially flat and/or planar distal end to further tailor the distribution of the sound wave profiles exiting the waveguide. In further embodiments, the waveguide's distal end can have other shapes (i.e., multi-planar, partially-circular, partially-spherical, etc., or combinations thereof), and the distal end can be at one or more selected angles relative to the longitudinal axis of the waveguide 100.

FIGS. 5-8 show another embodiment of an acoustic waveguide 200 configured in accordance with the present technology. Certain features of the acoustic waveguide 200 are similar to features of the waveguide 100, with FIGS. 5-8 generally corresponding to FIGS. 1-4, respectively. The similar features have like reference numbers, except the reference number are in the 200-series for the acoustic waveguide 200, unless otherwise noted. The acoustic waveguide 200 is configured to interface with two high-frequency compression drivers 201 laterally spaced apart from each other and coupled to mounting surfaces 214*a* and 214*b* at a proximal end 280. The mounting surfaces 214*a* and 214*b* may be generally positioned perpendicular to a top surface 284 of a housing portion 202, and the bottom surface 286 of a housing portion 204, and axially aligned with inlet apertures 216*a* and 216*b*. In other embodiments the mounting surfaces can be configured to position the drivers 201 at a selected angle relative to the distal surface of the waveguide (i.e., in the range of about 0°-90°). While the illustrated embodiment is shown with two compression drivers 201, other embodiments can have other numbers of compression drivers 201 and corresponding mounting surfaces. The housing portions 202 and 204 defining the housing 203 are similar to the housing portions 102 and 104 of the waveguide 100, but has a different number of inlet apertures, high-frequency sound channels, mounting surfaces, outlet apertures, etc., as shown in FIGS. 5-8.

Among other differing aspects, the acoustic waveguide 200 differs from the waveguide 100 by having separate but mirror symmetrical sound channels relative to each high-frequency driver HFD. In this regard, a plurality of sound channels 220*a-f*, extending from the inlet aperture 216*a*, are mirror symmetrical to a plurality of sound channels 250*a-f*, extending from the inlet aperture 216*b*, about a centered vertical, longitudinal plane parallel to the orientation and located equidistant between the inlet apertures 216*a* and 216*b*. While the same mirror symmetry of the housing 203 about the mounting surfaces is present, the mirror symmetry about the vertical, longitudinal plane provides an increased soundstage at the outlet apertures 226*a-f* and 256*a-f*. Unlike the waveguide 100, in the acoustic waveguide 200, each separate mirror symmetrical sound channel group (e.g., 220*a-f* or 250*a-f*) is not itself mirror symmetrical about a central axis of the respective inlet aperture 216*a* and 216*b*. For example, while the outermost sound channels 120*a* and 120*h* of the waveguide 100 are mirror symmetrical about the central axis of the inlet aperture 116, the outermost sound channels 220*a* and 220*f* (or 250*a* and 250*f*) are not mirror symmetrical about the central axis of the inlet aperture 216*a* (or 216*b*).

In the illustrated embodiment, each group of sound channels 220*a-f* and 250*a-f* has six channels. In other embodiments, each group has greater than four sound channels. The acoustic waveguide 200 may also omit the inlet sound channels (i.e., the inlet sound channels 117*a* and 117*b* of the waveguide 100) and transition the sound waves directly to secondary sound channels 221*ab*, 221*cd*, 221*ef*, 251*ab*, 251*cd*, and 251*ef*, among other possible configurations. The sound channels 220*a-f* and 250*a-f* may include a fewer or greater quantity or degree of arcuate bends when compared with the sound channels 120*a-h*, such as shown in FIG. 8. The sound channels 220 within the waveguide can also be configured with a greater of fewer number of stages of channel splitting or dividing for selected larger or smaller compression drivers.

The acoustic waveguide 200 includes two sets of high-frequency sound channels 220*a-f* and 250*a-f*, each coupled a respective one of the two drivers 201. As described above with respect to the waveguide 100, the sound channels 220*a-f* and 250*a-f* terminate at outlet apertures 226*a-f* and 256*a-f* in the distal end 282 of the housing 203. In the illustrated embodiment, a distal mounting flange 210 is provided at the distal end 282 of the housing 203 generally adjacent to the outlet apertures 226*a-f* and 256*a-f*. The distal mounting flange 210 may be configured to be affixed to a speaker housing (not shown) to hold the acoustic waveguide 200 and the associated high-range drivers 201 in position in the speaker housing. In some embodiments, the mounting flange 210 can be used to couple the acoustic waveguide 200 to a horn (not shown), such as a horn attached to the speaker housing.

In some embodiments, the lateral flare surfaces 232*a-f*, 234*a-f*, 262*a-f*, and 264*a-f* may have flare angles 246*a-f* and 286*a-f* between about 10° and 20°. In other embodiments, the lateral flare surfaces 232*a-f*, 234*a-f*, 262*a-f*, and 264*a-f* may have flare angles 246*a-f* and 286*a-f* between about 14° and 18°. In further embodiments, the lateral flare surfaces 232*a-f*, 234*a-f*, 262*a-f*, and 264*a-f* may have flare angles 246*a-f* and 286*a-f* of about 16°. The width of each outlet aperture 226*a-f* and 256*a-f* in the lateral direction can comprise between about 7% and 14% of the overall width 209 of the acoustic waveguide 200. In other embodiments, the width of each outlet aperture 226*a-f* and 256*a-f* in the lateral direction comprises between about 8% and 13% of the overall width 209 of the acoustic waveguide 200.

Figure 10A:
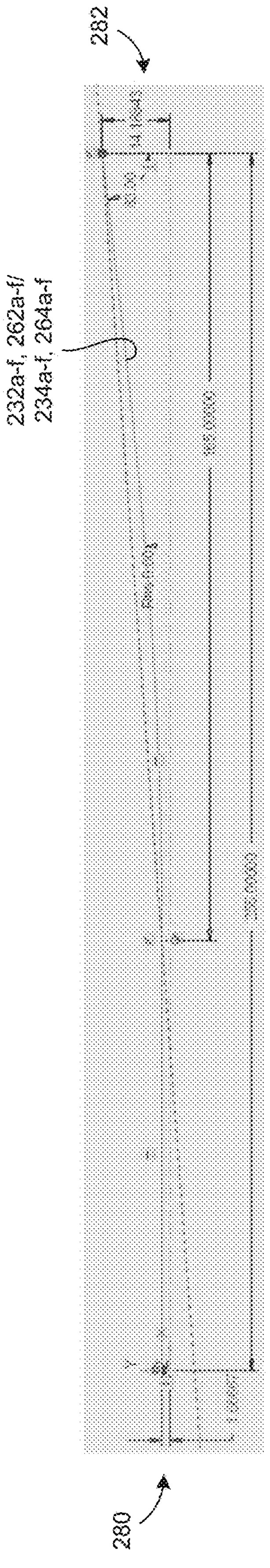
FIGS. 10A and 10B are schematic detail views of a lateral flare profile and a vertical flare profile, respectively, of the acoustic waveguide of FIG. 5.
Figure 10B:
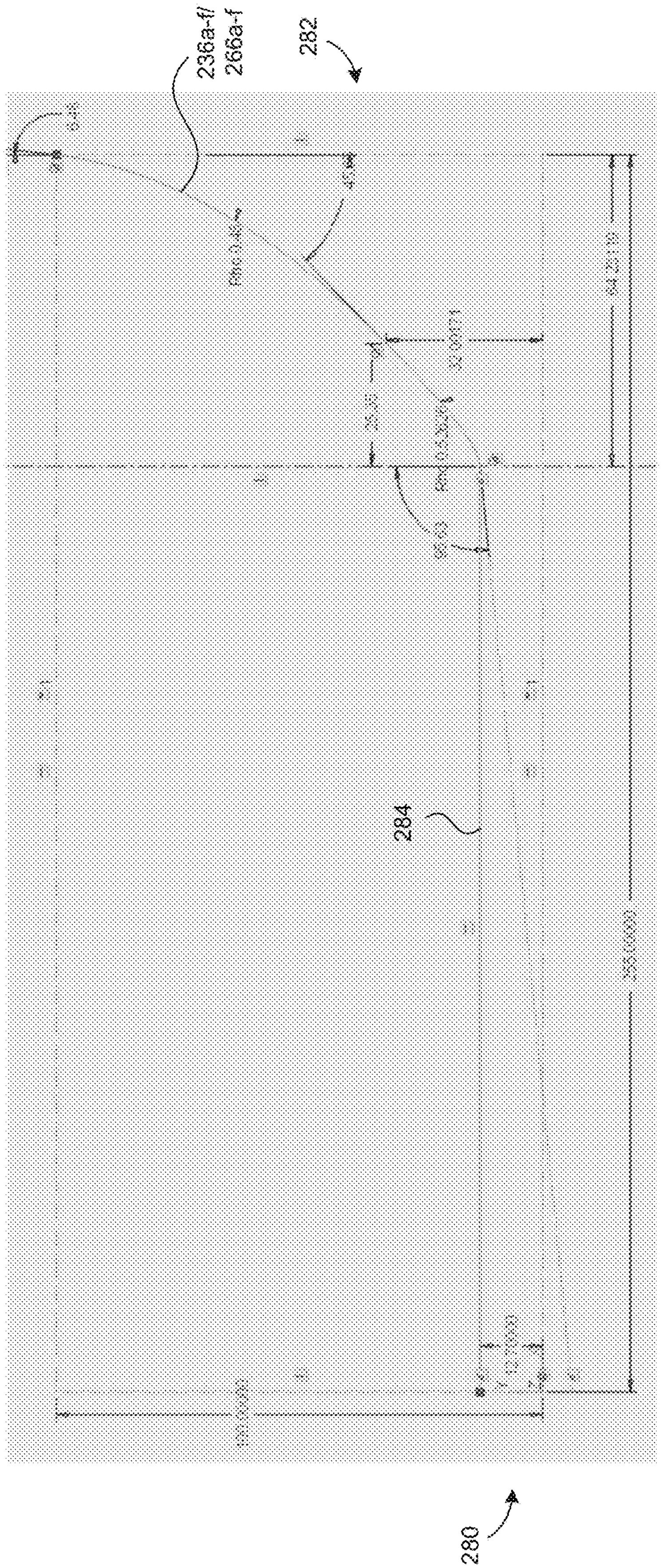

In embodiments with lateral flares, generally having lateral flare surfaces 232*a-f*, 234*a-f*, 262*a-f*, and 264*a-f*, the depth of the flared portions of the sound channels 220*a-f* and 250*a-f* is between about 80% and 87% of the depth D of the acoustic waveguide 200, and/or the lateral flared portions of the sound channels 220*a-f* and 250*a-f* comprise between about 57% and 73% of the overall length of the sound paths 222*a-f* and 252*a-f*. In other embodiments, the depth of the flared portion of the sound channels 220*a-f* and 250*a-f* is between about 83% and 85% of the depth D of the acoustic waveguide 200, and/or lateral flared portions of the sound channels 220*a-f* and 250*a-f* comprise between about 62% and 68% of the overall length of the sound paths 222*a-f* and 252*a-f*. In further embodiments, the depth of the flared portion of the sound channels 220*a-f* and 250*a-f* is greater than about 82% of the depth D of the acoustic waveguide 200, and/or the lateral flared portions of the sound channels 220*a-f* and 250*a-f* comprise about 65% of the overall length of the sound paths 222*a-f* and 252*a-f*. The lateral flare surfaces 232*a-f*, 234*a-f*, 262*a-f*, and 264*a-f* may be defined by a conic shape having a fixed length, rho value, exit angle, and exit width. In yet another embodiment wherein the sound channels 220*a-f* and 250*a-f* have different resonance frequencies than the above embodiments, the depth of the flared portions of the sound channels 220*a-h* and 250*a-f* having lateral flare surfaces 232*a-f*, 234*a-f*, 262*a-f*, and 264*a-f* can be in the range of approximately 65%-78%, or more specifically in the range of approximately 68%-75%, or more specifically, in the range of approximately 70%-73%, and even more specifically in the range of 70.73%-72.99%. FIGS. 10A and 10B show exemplary profiles in the lateral (FIG. 10A) and vertical (FIG. 10B) directions in a schematic representation. The profiles are shown with straightened sound paths for sake of clarity and illustration purposes only. These examples show dimensional detail of one representative configuration of the lateral and vertical flares in the sound channels 220*a-f* and 250*a-f*.

In embodiments with vertical flares, generally having vertical flare surfaces 236*a-f*, 238*a-f*, 266*a-f*, and 268*a-f*, the vertical flared portions of the sound channels 220*a-f* and 250*a-f* comprise between about 20% and 30% of the overall length of the sound paths 222*a-f* and 252*a-f*. In other embodiments, the vertical flared portions of the sound channels 220*a-f* and 250*a-f* comprise between about 23% and 27% of the overall length of the sound paths 222*a-f* and 252*a-f*. In further embodiments, the vertical flared portions of the sound channels 220*a-f* and 250*a-f* comprise about 25% of the overall length of the sound paths 222*a-f* and 252*a-f*. The vertical flare surfaces 236*a-f*, 238*a-f*, 266*a-f*, and 268*a-f* may be defined by a dual conic shape having a first portion with a fixed length, rho value, exit angle, and exit width, and a second portion with a fixed length, rho value, exit angle, and exit width. In some embodiments, the vertical flare surfaces 236*a-f*, 238*a-f*, 266*a-f* and 268*a-f* are configured to provide an acoustic dispersion pattern having an angle of about 90° from the distal end 282 along the vertical direction.

In some embodiments, the sound paths 222*a-f* and 252*a-f* have an acoustic length of between about 120% and 200% of the depth D (see FIG. 7) of the waveguide 200. In other embodiments, the sound paths 222*a-f* and 252*a-f* have an acoustic length of between about 130% and 145% of the depth D of the waveguide 200. In yet other embodiments, the sound paths 222*a-f* and 252*a-f* have an acoustic length of between about 136% and 139% of the depth D of the waveguide 200. In further embodiments, the sound paths 222*a-f* and 252*a-f* have an acoustic length of about 136.7% of the depth D of the waveguide 200.

As used in the foregoing description, the terms "vertical," "lateral," "upper," and "lower" can refer to relative directions or positions of features in the waveguide in view of the orientation shown in the Figures. For example, "upper" or "uppermost" can refer to a feature positioned closer to the top of a page than another feature. These terms, however, should be construed broadly to include waveguides having other orientations, such as inverted or inclined orientations where top/bottom, over/under, above/below, up/down, left/right, and distal/proximate can be interchanged depending on the orientation. Moreover, for ease of reference, identical reference numbers are used to identify similar or analogous components or features throughout this disclosure, but the use of the same reference number does not imply that the features should be construed to be identical. Indeed, in many examples described herein, identically numbered features have a plurality of embodiments that are distinct in structure and/or function from each other. Furthermore, the same shading may be used to indicate materials in cross section that can be compositionally similar, but the use of the same shading does not imply that the materials should be construed to be identical unless specifically noted herein.

The foregoing disclosure may also reference quantities and numbers. Unless specifically stated, such quantities and numbers are not to be considered restrictive, but exemplary of the possible quantities or numbers associated with the new technology. Also, in this regard, the present disclosure may use the term "plurality" to reference a quantity or number. In this regard, the term "plurality" is meant to be any number that is more than one, for example, two, three, four, five, etc. For the purposes of the present disclosure, the phrase "at least one of A, B, and C," for example, means (A), (B), (C), (A and B), (A and C), (B and C), or (A, B, and C), including all further possible permutations when greater than three elements are listed.

From the foregoing, it will be appreciated that specific embodiments of the new technology have been described herein for purposes of illustration, but that various modifications may be made without deviating from the present disclosure. Accordingly, the invention is not limited except as by the appended claims. Furthermore, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the present disclosure. Accordingly, the present disclosure and associated technology can encompass other embodiments not expressly shown or described herein.

We claim:

1. An acoustic waveguide, comprising:

a housing having a proximal end with an inlet aperture, a distal end with an outlet aperture, and a depth from the proximal end to the distal end;

a mounting flange positioned at the proximal end and configured to acoustically couple a driver to the inlet aperture; and a plurality of sound channels extending through the housing and acoustically coupling the inlet aperture to the outlet aperture, each sound channel having— a bend area at an intermediate position along the sound channel, and a flare portion downstream of the bend area and extending from the bend area to the outlet aperture, wherein the flare portion extends along approximately 49%-69% of the depth of the housing.

2. The acoustic waveguide of claim 1 wherein the flare portion extends along approximately 55%-65% of the depth of the housing.

3. The acoustic waveguide of claim 1 wherein each sound channel at least partially defines a sound path having an acoustic length, and wherein the acoustic length of each sound path of the plurality of sound channels is substantially equal to the acoustic length of each of the other sound paths.

4. The acoustic waveguide of claim 1, further comprising a plurality of inlet sound channels positioned between and acoustically coupling the inlet aperture and the plurality of sound channels, wherein the inlet sound channels divide the inlet aperture into at least two sound paths.

5. The acoustic waveguide of claim 1 wherein the plurality of sound channels comprises primary sound channels, wherein the acoustic waveguide further comprises a plurality of secondary sound channels positioned between and acoustically coupling the inlet sound channels and the primary sound channels.

6. The acoustic waveguide of claim 1 wherein a ratio of a depth of the housing to a width of the outlet aperture is in the range of about 1:1.2 to 1:2, in the range of about 1:1.4 to 1:1.8, is about 1:1.44, or is about 1:1.73.

7. The acoustic waveguide of claim 1 wherein the acoustic length of the sound channels is between about 120% and 200% of the depth of the housing, between about 130% and 145% of the depth of the housing, between about 138% and 141% of the depth of the housing, about 139.6% of the depth of the housing, or about 136.7% of the depth of the housing.

8. The acoustic waveguide of claim 1 wherein the outlet aperture is partitioned such that each of the plurality of sound channels is acoustically coupled to an individual portion of the outlet aperture.

9. The acoustic waveguide of claim 1 wherein the acoustic waveguide is mirror symmetric about a plane perpendicular to a surface of the mounting flange bisecting the inlet aperture, and wherein the plane is positioned vertically such that a vector across the width of the acoustic waveguide is normal to the plane.

10. The acoustic waveguide of claim 1 wherein the distal end of the housing has a curved shape defined by the plurality of flare portions.

11. The acoustic waveguide of claim 1 wherein the bend area of each sound path is an arcuate path defined by at least one bend having a radius of curvature and having a path width at the at least one bend, wherein the radius of curvature is equal to or greater than double the path width at the bend.

12. An acoustic waveguide, comprising:

a housing having a proximal end with an inlet aperture, a distal end with an outlet aperture, and a depth from the proximal end to the distal end;

a mounting flange positioned at the proximal end and configured to acoustically couple a driver to the inlet aperture; and a plurality of sound channels extending through the housing and acoustically coupling the inlet aperture to the outlet aperture, each sound channel having— a bend area at an intermediate position along the sound channel, and a flare portion downstream of the bend area and extending from the bend area to the outlet aperture, wherein the acoustic length of the sound channels is between about 120% and 200% of the depth of the housing.

13. The acoustic waveguide of claim 12 wherein the flare portion extends along approximately 55%-65% of the depth of the housing.

14. The acoustic waveguide of claim 12 wherein each sound channel at least partially defines a sound path having an acoustic length, and wherein the acoustic length of each sound path of the plurality of sound channels is substantially equal to the acoustic length of each of the other sound paths.

15. The acoustic waveguide of claim 12, further comprising a plurality of inlet sound channels positioned between and acoustically coupling the inlet aperture and the plurality of sound channels, wherein the inlet sound channels divide the inlet aperture into at least two sound paths.

16. The acoustic waveguide of claim 12 wherein the distal end of the housing has a curved shape defined by the plurality of flare portions.

17. An acoustic waveguide, comprising:

a housing having a proximal end with an inlet aperture and a distal end with an outlet aperture;

a mounting flange positioned at the proximal end and configured to acoustically couple a driver to the inlet aperture; and a plurality of sound channels extending through the housing and acoustically coupling the inlet aperture to the outlet aperture, each sound channel at least partially defining a sound path having an acoustic length, and each sound channel having a flare portion extending from the outlet aperture upstream toward the inlet aperture, wherein the flare portion extends along approximately 55%-65% of the depth of the housing.

18. The acoustic waveguide of claim 17 wherein each sound channel at least partially defines a sound path having an acoustic length, and wherein the acoustic length of each sound path of the plurality of sound channels is substantially equal to the acoustic length of each of the other sound paths.

19. The acoustic waveguide of claim 17 wherein the flare portion extends along approximately 30% of the acoustic length of each sound channel.

20. The acoustic waveguide of claim 17 wherein the flare portion extends along at least 30% of the acoustic length of each sound channel.

21. The acoustic waveguide of claim 17 wherein the flare portion extends along approximately 20%-30% of the acoustic length of each sound channel.

22. The acoustic waveguide of claim 17 wherein the flare portion of each of the plurality of sound channels flares laterally and/or vertically outwards from the bend area to the distal end, and wherein the lateral flares of each of the flare portions define a flare angle at distal portions of the plurality of sound channels between about 10° and 20°, between about 12° and 18°, or between about 14° and 16°.

23. An acoustic waveguide, comprising:

a housing having a proximal end with a first inlet aperture and a second inlet aperture and a distal end with a first outlet aperture and a second outlet aperture, and a depth from the proximal to the distal end;

a first mounting flange positioned at the proximal end and configured to acoustically couple a first driver to the first inlet aperture;

a second mounting flange positioned at the proximal end and configured to acoustically couple a second driver to the second inlet aperture;

a plurality of first sound channels extending through the housing and acoustically coupling the first inlet aperture to the first outlet aperture; and a plurality of second sound channels extending through the housing and acoustically coupling the second inlet aperture to the second outlet aperture, wherein each of the plurality of the first and second sound channels have— a bend area at an intermediate position along the sound channel, and a flare portion downstream of the bend area and extending from the bend area to the outlet aperture, wherein the flare portion extends along approximately 49%-69% of the depth of the housing.

24. The acoustic waveguide of claim 23 wherein the acoustic length of at least the first sound channels is between about 120% and 200% of the depth of the housing.

25. The acoustic waveguide of claim 23 wherein the distal end of the housing has a curved shape defined by the flare portions.

26. The acoustic waveguide of claim 23 wherein the flare portion extends along approximately 20%-30% of the acoustic length of each sound channel.

* * * * *